United States Patent
Peinert et al.

(10) Patent No.: US 11,433,868 B2
(45) Date of Patent: Sep. 6, 2022

(54) SYSTEM AND METHOD FOR DETERMINING WATER CONTENT IN BRAKE FLUID

(71) Applicant: Volvo Car Corporation, Gothenburg (SE)

(72) Inventors: Niklas Peinert, Gothenburg (SE); Madeleine Stoopendahl, Klövedal (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/423,651

(22) Filed: May 28, 2019

(65) Prior Publication Data

US 2020/0001850 A1    Jan. 2, 2020

(30) Foreign Application Priority Data

Jun. 29, 2018 (EP) .................................. 18180721

(51) Int. Cl.
*B60T 17/22* (2006.01)
*B60T 1/06* (2006.01)
(Continued)

(52) U.S. Cl.
CPC ............ *B60T 17/221* (2013.01); *B60T 1/065* (2013.01); *F16D 55/22* (2013.01); *F16D 66/00* (2013.01);
(Continued)

(58) Field of Classification Search
CPC .. F16D 66/00; F16D 2066/001; F16D 66/027; F16D 66/028; F16D 55/22;
(Continued)

(56) References Cited

U.S. PATENT DOCUMENTS 3,282,149 A * 11/1966 Shaw ................... G01N 21/431
356/130
4,240,747 A * 12/1980 Harmer ............... G01F 23/2921
250/227.25
(Continued)

FOREIGN PATENT DOCUMENTS

CN          1275201 A     11/2000
DE          3816315 A1    12/1989
(Continued)

OTHER PUBLICATIONS

English translation of EP 0205870A1 (Year: 1986).*
(Continued)

*Primary Examiner* — Robert A. Siconolfi
*Assistant Examiner* — Mahbubur Rashid
(74) *Attorney, Agent, or Firm* — Clements Bernard Walker; Christopher L. Bernard

(57) ABSTRACT

A brake system for a vehicle including: a brake caliper; a brake fluid container connected to a brake pipe; a brake hose connecting the brake pipe to the brake caliper; a refractometer arranged in the proximity of the brake caliper and configured to measure a refraction of the brake fluid at the brake caliper; a temperature sensor arranged in the proximity of the refractometer and configured to measure a temperature of the brake fluid in the proximity of the brake caliper; and a control unit configured to determine a water content of the brake fluid based on the measured refraction and the measured temperature.

10 Claims, 4 Drawing Sheets

(51) Int. Cl.
*F16D 55/22* (2006.01)
*F16D 66/00* (2006.01)

(52) U.S. Cl.
CPC .. *F16D 2066/001* (2013.01); *F16D 2066/006* (2013.01)

(58) Field of Classification Search
CPC ...... F16D 66/006; B60T 17/22; B60T 17/221; B60T 1/065
See application file for complete search history.

(56) References Cited

U.S. PATENT DOCUMENTS

| | | | |
|---|---|---|---|
| 5,311,274 A * | 5/1994 | Cole, Jr. | G01N 33/03 356/128 |
| 5,570,937 A * | 11/1996 | Wolfsried | B60T 7/12 188/1.11 E |
| 5,663,790 A * | 9/1997 | Ekstrom | G01N 21/41 204/452 |
| 5,969,808 A | 10/1999 | Cotton et al. | |
| 6,633,035 B1 | 10/2003 | Katagiri et al. | |
| 10,145,789 B2 * | 12/2018 | Accetta | G01N 21/4133 |
| 2009/0236157 A1 * | 9/2009 | Akamatsu | B60L 3/0076 180/55 |
| 2010/0026988 A1 * | 2/2010 | Cros | B60T 17/22 356/51 |
| 2014/0368823 A1 | 12/2014 | Wirthli et al. | |
| 2016/0052501 A1 * | 2/2016 | Darscht | B60T 8/4081 701/70 |
| 2017/0166178 A1 * | 6/2017 | Masuda | B60T 8/00 |

FOREIGN PATENT DOCUMENTS

| | | | | |
|---|---|---|---|---|
| DE | 10350922 A1 * | 5/2005 | | B60T 11/10 |
| DE | 10350922 A1 | 5/2005 | | |
| DE | 102015016887 A1 * | 6/2017 | | G01N 27/221 |
| EP | 0205870 A1 | 12/1986 | | |
| FR | 2863236 A1 * | 6/2005 | | B60T 11/10 |
| GB | 2200997 A * | 8/1988 | | G01N 33/2847 |
| GB | 2230098 A * | 10/1990 | | B60T 11/26 |
| JP | S53148495 A | 12/1978 | | |
| JP | H11352055 A | 12/1991 | | |
| WO | WO-9530891 A1 * | 11/1995 | | G01N 27/06 |
| WO | 9906818 A1 | 2/1999 | | |
| WO | WO-9846984 A3 * | 2/1999 | | G01N 33/2847 |

OTHER PUBLICATIONS

English translation of WO 9846984A3 (Year: 1999).*
English translation of DE10350922A1 (Year: 2005).*
Thomas E. Ryan, Determining Brake Fluid Quality by Refractometer a European Study of New and "In-Service" Fluids, pp. 1-9, Buffalo, New York USA 14240-0123.
Jan. 29, 2019 European Search Report issue on International Application No. EP18180721.
First office action and search report issued in the corresponding CN application No. 201910542065.1.

* cited by examiner

SYSTEM AND METHOD FOR DETERMINING WATER CONTENT IN BRAKE FLUID

CROSS-REFERENCE TO RELATED APPLICATION

The present disclosure claims the benefit of priority of co-pending European Patent Application No. 18180721.5, filed on Jun. 29, 2018, and entitled "SYSTEM AND METHOD FOR DETERMINING WATER CONTENT IN BRAKE FLUID," the contents of which are incorporated in full by reference here.

TECHNICAL FIELD

The present invention relates to a system for determining the water content of brake fluid in a brake system for a vehicle. In particular, the present invention relates to the determination of the water content of brake fluid in a brake caliper.

BACKGROUND

It is important to ensure that the brake fluid in the brake system of a vehicle does not contain too much water. An elevated water content increases the freezing temperature and reduces the boiling point which may lead to that the brake fluid freezes in cold conditions and that it starts to boil during normal operating conditions. Both freezing and boiling of the brake fluid may lead to a reduced braking effect and/or to damage of the brake system. Accordingly, it must be ensured that the water content of the brake fluid remains below a predetermined threshold level.

The brake fluid is naturally hydroscopic, meaning that it easily attracts water from the surrounding environment. The water content of brake fluid is in part influenced by the ambient temperature in combination with the air humidity. However, since the average temperature and humidity where the vehicle is operated will be different in different locations, it is difficult to estimate the long term buildup of water in the brake fluid. A vehicle operated in coastal regions may for example build up water in the brake fluid many times faster than a vehicle at an inland location with dry air.

In order to be able to estimate when a service of the brake fluid is needed, the water content of the brake fluid must somehow be measured since theoretical calculations are not feasible due to the number of variables involved influencing the properties of the brake fluid. Moreover, since the temperature of the brake fluid is highest at the brake caliper, it is the brake fluid at the brake caliper that is most likely to boil. Therefore, it is desirable to determine the water content of the brake fluid in the brake caliper. However, to determine the water content of brake fluid in the brake calipers would be both complex and expensive using known methods and thereby difficult to industrialize in a production vehicle.

Accordingly, there is a need for improved means for determining the water content in brake fluid of a brake system for a vehicle.

SUMMARY

In view of above-mentioned and other drawbacks of the prior art, it is an object of the present invention to provide an improved system and method for determining the water content of brake fluid in a brake system.

According to a first aspect of the invention, there is provided a brake system for a vehicle including: a brake caliper; a brake fluid container connected to a brake pipe; a brake hose connecting the brake pipe to the brake caliper; a refractometer arranged in the proximity of the brake caliper and configured to measure a refraction of the brake fluid at the brake caliper; a temperature sensor arranged in the proximity of the refractometer and configured to measure a temperature of the brake fluid at the brake caliper; and a control unit configured to determine a water content of the brake fluid based on the measured refraction and the measured temperature.

The refractometer may be regarded as a sensor unit including at least an interface arranged to be in contact with the brake fluid in order to provide light to and measure the refraction of the brake fluid. The sensor unit including the refractometer may include its own readout circuitry or it may be connected to an outside module, such as the control unit, for controlling the refraction measurement.

That the refractometer is arranged in the proximity of the brake caliper should be interpreted to mean that the refractometer is located in a part of the brake system related to a specific brake caliper, such as a brake pipe or brake hose, and not in a centrally located brake fluid container or the like.

The present invention is based on the realization that the water content of brake fluid in a brake system can be measured in-situ within the brake system with high accuracy by using a refractometer and a temperature sensor. The refractive properties of the brake fluid are temperature dependent, and by knowing the temperature, an accurate determination of the water content in the brake fluid can be performed for different operating conditions based on a known relation between refraction and water content of the brake fluid for a given temperature. Thereby, the service interval for changing the brake fluid can be determined more accurately, and it is not required to take the vehicle to a workshop for determining if the brake fluid needs to be changed. Moreover, the small size of a refractometer provides flexibility in where the refractometer can be located, allowing the measurement to be performed in-situ within the brake system close to the brake caliper. Accordingly, the exact position of the refractometer can be determined based on what is suitable for a specific brake system. A further advantage of using a refractometer in comparison to many known measurement methods that are based on the conductivity of the brake fluid, is that the conductivity may change as a result of corrosion of the brake pipe and of the brake caliper, which is not the case for refraction. This means that a gradual change in conductivity of the brake fluid is not necessarily directly attributable to a change in water content. Thereby, the described brake system offers a number of advantages over known systems. Moreover, the refractometer can be made mechanically robust to withstand the environment to which a vehicle brake system is exposed.

According to one embodiment of the invention, the refractometer is arranged in a connector connecting the brake hose to the brake caliper. The connector may then be specifically adapted to house the refractometer sensor unit and the temperature sensor. Moreover, it is advantageous to measure the water content as close as possible to the brake caliper since the brake caliper will be the component which is most exposed to heat. This means that the temperature of the brake fluid will be highest at the brake caliper, and boiling of the brake fluid is therefore most likely to occur in the brake caliper. Accordingly, even if the water content of the brake fluid in principle may be higher in other parts of the brake system, the risk of boiling is lower with increasing distance from the brake caliper. There is also a typically seal in the brake caliper through which water may enter the brake system.

According to one embodiment of the invention, the refractometer may be arranged in a portion of the brake hose adjacent to the brake caliper. Water may enter into the brake system by means of permeation through osmosis in the brake hoses, i.e. through the walls of the brake hose. The rate of permeation through the rubber material of the brake hose depends both on temperature and on the air humidity, and an elevated air temperature and air humidity will thus increase the rate of water buildup in the brake fluid near the brake calipers. It should be noted that there is no natural circulation of brake fluid in the brake system, and that water entering the brake fluid at or near the brake calipers can be assumed to remain there and to only very slowly become evenly distributed in the brake fluid throughout the brake system. Accordingly, the water content can be assumed to be higher in the brake hoses compared to in some other parts of the brake system, and it is thus advantageous to determine the water content at a point where it is high since it will influence the performance of the brake system, and since the brake fluid having the highest water content may be most susceptible to freezing.

According to one embodiment of the invention, the refractometer may advantageously be arranged within the brake caliper. Thereby, the sensor will be well protected from exposure to the environment and the brake caliper will also be the location in the brake system where the brake fluid reaches the highest temperatures.

According to one embodiment of the invention, the refractometer may be arranged in the brake pipe. Arranging the refractometer in the brake pipe may lead to lower tooling costs and also provides a large flexibility in where the refractometer is placed. Accordingly, the refractometer and any associated circuitry or wiring may be placed at a location along the brake pipe where it is most convenient.

According to one embodiment of the invention, the refractometer may be arranged in a connection between the brake pipe and the brake hose. Thereby, there is no need to modify the existing components of the brake system since the refractometer can be adapted to fit between and form an interface between the brake pipe and the brake hose.

According to one embodiment of the invention, the temperature sensor may advantageously be arranged in an integrated sensor module together with the refractometer. Thereby, the temperature can be measured at the exact location where the refraction is measured, providing a high accuracy of the determination of water content. It is of course also possible to place the temperature separately from the refractometer as long as it can be assumed that the temperature of brake fluid at the refractometer is approximately the same as the temperature measured by the temperature sensor.

According to one embodiment of the invention, the refractometer is configured to determine the water content of the brake fluid with an accuracy of ±0.1% or better. It has been found that that at a water content of approximately 2-4%, the wet boiling point of the brake fluid may coincide with operating temperatures occurring in an example brake system. The wet boiling point of brake fluid is defined as the boiling point for brake fluid at a given water content. However, a safety margin is preferably employed so that a critical boiling temperature for the brake system is reached only for a water content which is significantly higher than the above 2-4% range, while a water content in the described range is used to indicate that the brake fluid needs to be replaced. Moreover, the boiling point for a particular brake fluid at a given water content may be different depending on the type of brake fluid used. Accordingly, a resolution of at least ±0.1% is sufficient for accurately estimating when the brake fluid needs to be replaced.

According to one embodiment of the invention, the brake system may further include an optical fiber arranged to optically couple the refractometer to the brake fluid. By using an optical fiber to access the brake fluid, the refraction can be measured at locations in the brake system where it may be difficult to place a sensor. The optical fiber may for example be integrated in a sensor unit including the refractometer, and optionally also the temperature sensor.

According to one embodiment of the invention, the optical fiber is arranged such that an end portion of the optical filer is located within the brake pipe, brake hose, or brake caliper. This allows the refractometer itself to be placed at a convenient location which is not necessarily directly at the brake pipe, brake hose, or brake caliper.

There is also provided a vehicle including a brake system according to any one of the above described embodiments.

According to a second aspect of the invention, there is provided a method for monitoring a water content of brake fluid in a brake caliper. The method includes: determining a temperature of the brake fluid at the brake caliper; measuring a refraction of the brake fluid at the brake caliper using a refractometer arranged in the proximity of the brake caliper; and determining a water content of brake fluid at the brake caliper based on a known relation between refraction and the water of brake fluid for a given temperature.

Effects and advantages of the second aspect of the invention are largely analogous to those discussed above in relation to the first aspect of the invention.

According to one embodiment of the invention, the method further includes: acquiring a first refraction value at a first temperature; after at least a predetermined period of time has elapsed, acquiring a second refraction value at the first temperature; and determining if a difference between the first refraction value and the second refraction value exceeds a predetermined threshold value. Thereby, by measuring the water content at different times but at the same temperatures, it can be seen if the water content changes in a manner which is not consistent with the expected water increase. The predetermined period of time may for example be 24h. The water content may for example increase drastically if a part of the brake system breaks and takes in excess water. A change in water content which is higher than the predetermined threshold value may also indicate if something went wrong with the measurement. The refractometer may for example be faulty which would be discovered by the described method.

According to one embodiment of the invention, the method may further include continuously monitoring the water content of the brake fluid and determining a rate of change of the water content. To monitor continuously should in the present context be interpreted to mean that the water content is measured repeatedly during operation of the vehicle. The water content may for example be measured each time that the vehicle is started, each time that the brake fluid reaches a certain temperature, at the same time each day etc. By determining and monitoring the rate of change of the water content, aberrations can be discovered if the rate of change changes in an unexpected manner.

According to one embodiment of the invention, the method may further include comparing the rate of change of the water content in the brake fluid with a predetermined rate of change, and providing an alert if the determined rate-of-change is higher than the predetermined rate of change. For a known brake system, an expected rate of change of the water content during normal operation may be known, for example from tests in a laboratory environment or from data from other vehicles equipped with the same type of brake system. Accordingly, the measured rate of change can be compared with an expected rate of change of the water content.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

In the present detailed description, various embodiments of the brake system and method according to the present invention will be described with reference to a brake system for a vehicle.

Figure 1:
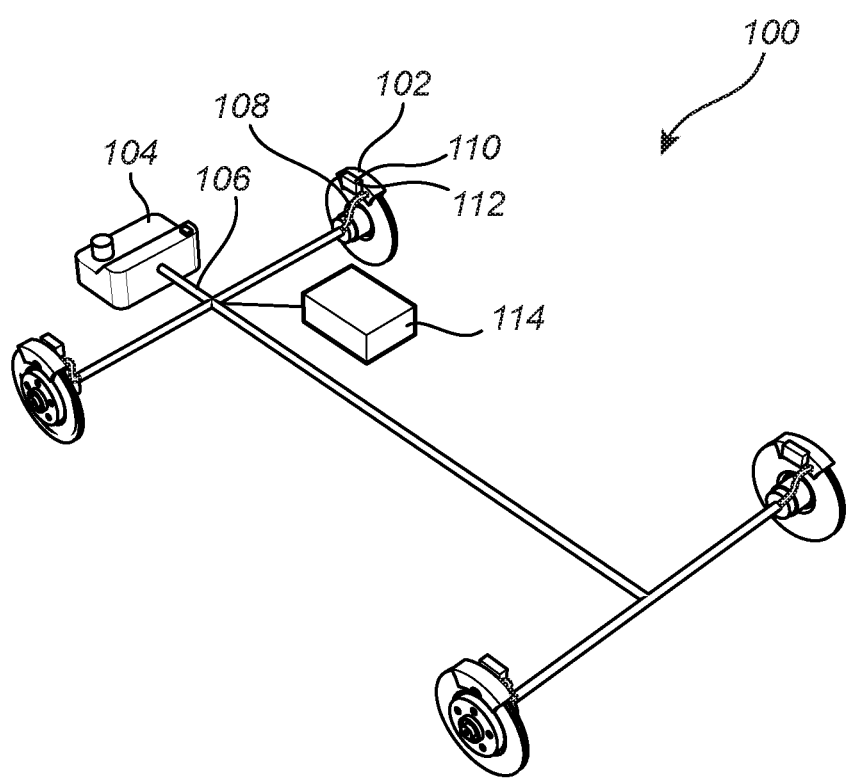
FIG. 1 schematically illustrates a brake system according to an embodiment of the invention.

FIG. 1 schematically illustrates a brake system 100 according to an embodiment of the invention. The brake system 100 includes a brake caliper 102, a brake fluid container 104 connected to a brake pipe 106, a brake hose 108 connecting the brake pipe 106 to the brake caliper 102, a refractometer 110 arranged in the proximity of the brake caliper 102 and configured to measure a refraction of the brake fluid at the brake caliper 102, a temperature sensor 112 arranged in the proximity of the refractometer 110 and configured to measure a temperature of the brake fluid in the proximity of the brake caliper 102. It should be noted that the figures are schematic and that the brake pipe in practice follows a more complex route to the brake caliper 102. Moreover, the connection between the brake fluid container 104 and the brake caliper 102 may consist of any combination of brake pipes and brake hoses, depending on what is suitable for a particular vehicle. In the present context, the brake hose 108 is considered to be flexible and made from a rubber material or the like and the brake pipe 106 is considered to be rigid and made from e.g. metal or plastic. The brake pipe 106 may also be referred to as a brake tube. However, the present invention is in no way limited to any specific combination of brake pipes and brake hoses. Various embodiments of the described system are applicable for any brake system including brake fluid where it is desirable to measure the water content of the brake fluid.

The brake system 100 further includes a control unit 114 configured to determine a water content of the brake fluid based on the measured refraction and the measured temperature.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device. Moreover, the control unit 114 may be a dedicated control unit 114 used by the brake system, or the described functionality of the control unit 114 may be integrated in a general purpose control unit, such as a so called ECU (Electronic Control Unit). The control unit 114 may also act as a power supply to the refractometer and/or to the temperature sensor.

Figure 2A:
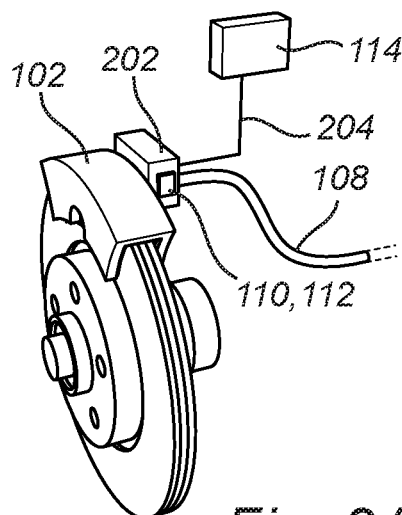
FIGS. 2A-D schematically illustrate details of a brake system according to an embodiment of the invention.

FIG. 2A schematically illustrates the refractometer 110 and the temperature sensor 112 arranged in a connector 202 connecting the brake hose 108 to the brake caliper 102. The refractometer 110 and the temperature sensor 112 may advantageously be arranged in a single sensor unit, but it is not required. As illustrated in FIG. 2A, the refractometer 110 and the temperature sensor 112 is connected to the control unit 114 by means of a cable 204. The cable 204 may be a fiber optical cable, an electrical signal cable or a combination thereof depending on the configuration of the refractometer 110 and the temperature sensor 112, e.g. depending on if any associated circuitry is arranged integrated with the sensors. The refractometer 110 and the temperature sensor 112 may have a size in the range of a few millimeters up to approximately a few centimeters, depending on the content of the sensor module. It should be noted that the drawings are not made to scale and that the illustrated size of various features such as the refractometer 110 or connector 202 may be exaggerated for clarity.

Figure 2B:
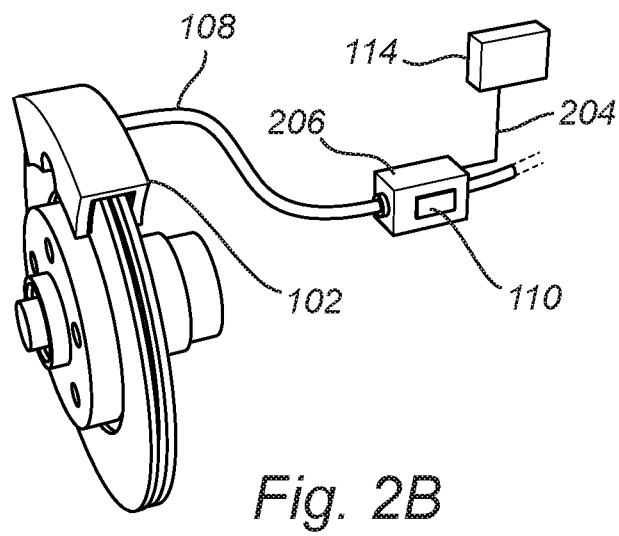

FIG. 2B illustrates a brake system 100 where the refractometer 110 is arranged in a portion of the brake hose 108 adjacent to the brake caliper 102. The refractometer 110 is here illustrated as being arranged in a T-coupling 206 connecting to the brake hose 108. Using a T-coupling 206, it is possible to measure the refraction directly at the T-coupling 206 by placing an optical fiber in the T-coupling 206. It is also possible to measure the refraction at a distance from the T-coupling 206 by extending an optical fiber into the brake hose 108, for example in the direction towards the brake caliper 102 to be able to measure the refraction as close to the brake caliper 102 as possible.

Figure 2C:
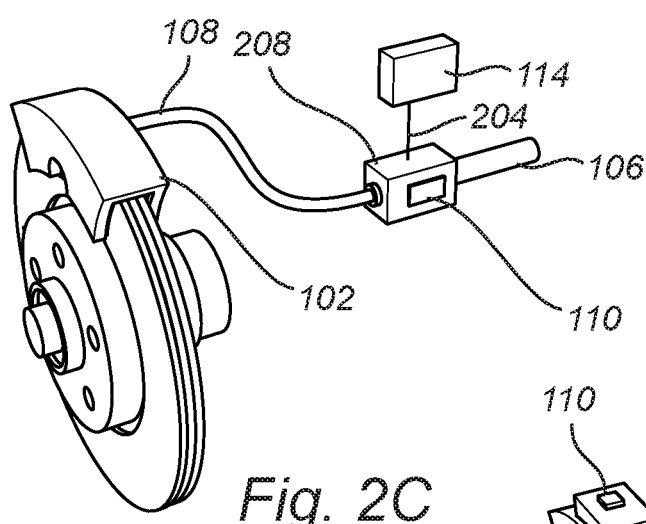
Figure 2D:
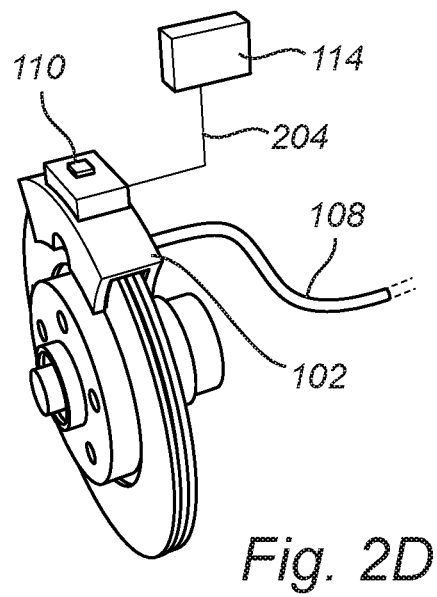

FIG. 2C illustrates a brake system 100 where the refractometer 110 is arranged in a connector 208 between the brake pipe 106 and the brake hose 108 and FIG. 2D illustrates a brake system 100 where the refractometer 110 is arranged within the brake caliper 102.

In a typical road vehicle, the brake hose 108 may have a length of about 0.5 m. A connector as close to the brake caliper is of course to be preferred, but due to a rather slow building up of the water content and an equilibration of the osmotic reaction, the water content in the brake hose and close to the brake hose can be considered be the same as in the brake caliper 102.

Figure 3:
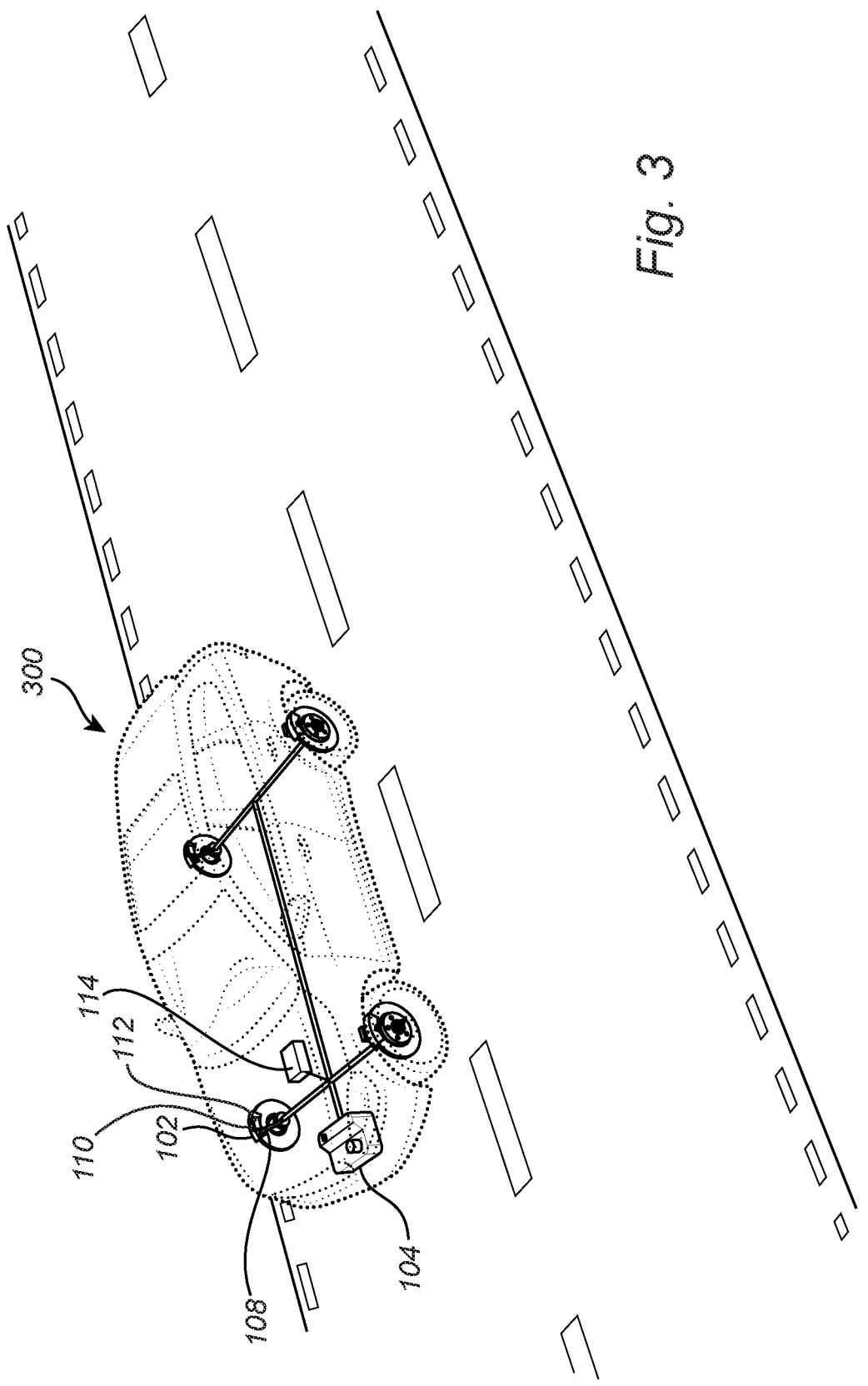
FIG. 3 schematically illustrates a vehicle including a brake system according to an embodiment of the invention.

FIG. 3 illustrates a vehicle 300 including a brake system 100 according to an embodiment of the invention. The refractometer 110 may in principle be placed at any one of the four brake calipers of the vehicle 300. However the rear wheel on a side opposite of the driver side may be considered to have the highest water content, and the refractometer 110 may thus be placed there. Many roads are built with a slope from a center of the road towards the edges so that water runs off the road, thereby avoiding that water is gathering on the road. This means that the wheels closest to the road edge, i.e. on the side opposite of the driver side, on average will be exposed to more water than the inner wheels, and water splashing onto parts of the brake system may influence the buildup of water in the brake fluid.

Figure 4:
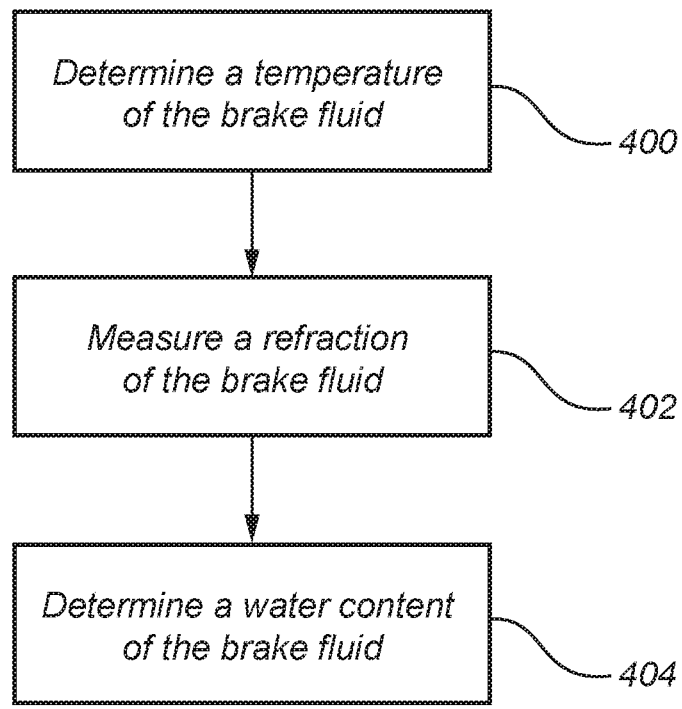
FIG. 4 is flow chart outlining the general steps of a method according to an embodiment of the invention.

FIG. 4 is a flow chart outlining the general steps of a method according to an embodiment of the invention. The method includes determining 400 a temperature of the brake fluid in the proximity of a brake caliper 102; measuring 402 a refraction of the brake fluid in the proximity of the brake caliper 102 using a refractometer 110; and determining 404 a water content of brake fluid in the proximity of the brake caliper 102 based on a known relation between refraction and the water content of the brake fluid for a given temperature.

Figure 5:
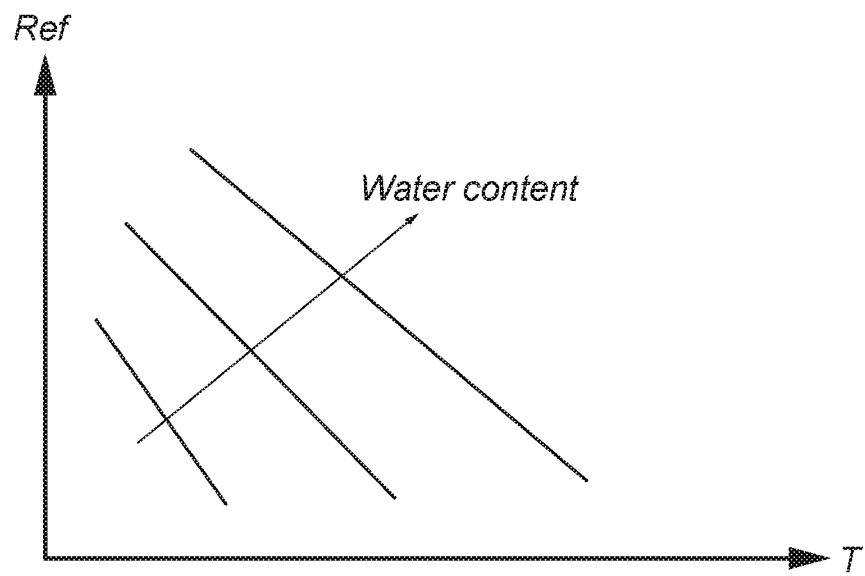
FIG. 5 schematically illustrates features of a brake system according to an embodiment of the invention.

FIG. 5 further illustrates general examples of the refraction of brake fluid as a function of temperature for different water contents. Thereby, by knowing the relation between refraction and water content for different operating temperatures, the water content can be determined for various operating conditions of the vehicle. The illustrated relations can be considered to be known for a given brake fluid for a sufficient number of temperatures within the temperature range of the brake fluid expected for normal operating conditions.

The buildup of water in in the brake fluid is typically rather slow. Depending of where in the world the vehicle is operated, and based on the climate conditions, it may take several years for the water content to reach critical levels during normal operation of the vehicle. Accordingly, any sudden changes in the water content can be attributed to either a failure in the brake system or to a faulty refractometer or temperature sensor.

The method may further include acquiring a first refraction value at a first temperature; after at least a predetermined time period of time has elapsed, acquiring a second refraction value at the first temperature; and determining if a difference between the first refraction value and the second refraction value exceeds a predetermined threshold value.

Moreover, the method may include continuously monitoring the water content of the brake fluid and determining a rate of change of the water content.

Furthermore, the method may include comparing the rate of change with a predetermined rate of change, and providing an alert if the determined rate-of-change is higher than the predetermined rate of change.

Moreover, the method may include comparing the temperature of the brake fluid with the external temperature as measured by a temperature sensor of the vehicle. If the vehicle is in an operating state when the temperature of the brake fluid is expected to be the same as the ambient temperature, i.e. when the vehicle has been stationary for a certain time period, a difference between the two temperatures may indicate that a temperature sensor is faulty. If the functionality of the vehicle temperature sensor can be determined by other means, a difference may indicate that the temperature sensor for measuring the temperature of the brake fluid is faulty.

Moreover, a changing difference between the ambient temperature and the brake fluid temperature which is observed repeatedly, i.e. for several consecutive days, may indicate an abnormal drift in the brake fluid temperature sensor.

Even though the invention has been described with reference to specific exemplifying embodiments thereof, many different alterations, modifications and the like will become apparent for those skilled in the art. Also, it should be noted that parts of the brake system may be omitted, interchanged or arranged in various ways, the brake system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A brake system for a vehicle, comprising:
a brake caliper;
a brake fluid container connected to a brake pipe;
a brake hose connecting the brake pipe to the brake caliper;
a refractometer arranged in one of the brake pipe, the brake hose, a connector connecting the brake hose to the brake caliper, and a connector connecting the brake hose to the brake pipe and configured to measure a refraction of brake fluid disposed in the one of the brake pipe, the brake hose, the connector connecting the brake hose to the brake caliper, and the connector connecting the brake hose to the brake pipe, wherein the refractometer utilizes an interface in the one of the brake pipe, the brake hose, the connector connecting the brake hose to the brake caliper, and the connector connecting the brake hose to the brake pipe by which the refractometer provides light to and measures refraction from the brake fluid disposed in the one of the brake pipe, the brake hose, the connector connecting the brake hose to the brake caliper, and the connector connecting the brake hose to the brake pipe;
a temperature sensor arranged in a proximity of the refractometer and configured to measure a temperature of the brake fluid in the proximity of the brake caliper; and
a control unit configured to determine a water content of the brake fluid based on the measured refraction and the measured temperature.

2. The brake system according to claim 1, wherein the temperature sensor is arranged in an integrated sensor module together with the refractometer.

3. The brake system according to claim 1, wherein the refractometer is configured to determine the water content of the brake fluid with an accuracy of ±0.1% or better.

4. The brake system according to claim 1, further comprising an optical fiber arranged to optically couple the refractometer to the brake fluid.

5. The brake system according to claim 4, wherein the optical fiber is arranged such that an end portion of the optical fiber is located within the one of the brake pipe, the brake hose, the connector connecting the brake hose to the brake caliper, and the connector connecting the brake hose to the brake pipe.

6. A vehicle comprising the brake system according to claim 1.

7. A method for monitoring a water content of brake fluid in a proximity of a brake caliper, comprising:
   determining a temperature of the brake fluid in the proximity of the brake caliper coupled to a brake hose, and a brake pipe;
   measuring a refraction of the brake fluid disposed in one of the brake pipe, the brake hose, a connector connecting the brake hose to the brake caliper, and a connector connecting the brake hose to the brake pipe using a refractometer arranged in the one of the brake pipe, the brake hose, the connector connecting the brake hose to the brake caliper, and the connector connecting the brake hose to the brake pipe and configured to measure a refraction of the brake fluid, wherein the refractometer utilizes an interface in the one of the brake pipe, the brake hose, the connector connecting the brake hose to the brake caliper, and the connector connecting the brake hose to the brake pipe by which the refractometer provides light to and measures refraction from the brake fluid disposed in the one of the brake pipe, the brake hose, the connector connecting the brake hose to the brake caliper, and the connector connecting the brake hose to the brake pipe; and
   determining a water content of the brake fluid in the proximity of the brake caliper based on a known relation between refraction and the water content of the brake fluid for a given temperature.

8. The method according to claim 7, further comprising:
   acquiring a first refraction value at a first temperature;
   after at least a predetermined period of time has elapsed, acquiring a second refraction value at the first temperature; and
   determining if a difference between the first refraction value and the second refraction value exceeds a predetermined threshold value.

9. The method according to claim 7, further comprising continuously monitoring the water content of the brake fluid and determining a rate of change of the water content.

10. The method according to claim 9, further comprising comparing the rate of change with a predetermined rate of change, and providing an alert if the determined rate-of-change is higher than the predetermined rate of change.

\* \* \* \* \*